(12) United States Patent
Khoury et al.

(10) Patent No.: US 12,337,644 B2
(45) Date of Patent: Jun. 24, 2025

(54) STATUS DISPLAY

(71) Applicant: SAF-HOLLAND GmbH, Bessenbach (DE)

(72) Inventors: Jean Khoury, Dubai (AE); Christopher Nagel, Großostheim (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 18/005,909

(22) PCT Filed: Jul. 27, 2021

(86) PCT No.: PCT/EP2021/070979
§ 371 (c)(1),
(2) Date: Jan. 18, 2023

(87) PCT Pub. No.: WO2022/023327
PCT Pub. Date: Feb. 3, 2022

(65) Prior Publication Data
US 2023/0322034 A1    Oct. 12, 2023

(30) Foreign Application Priority Data

Jul. 29, 2020 (DE) .................... 10 2020 119 968.6
Aug. 4, 2020 (DE) .................... 10 2020 120 524.4

(51) Int. Cl.
*B60G 7/00* (2006.01)
*B60G 7/02* (2006.01)

(52) U.S. Cl.
CPC .............. *B60G 7/001* (2013.01); *B60G 7/02* (2013.01); *B60G 2204/143* (2013.01); *B60G 2206/10* (2013.01); *B60G 2206/601* (2013.01)

(58) Field of Classification Search
CPC .............. F16C 11/0647; F16C 11/0628; F16C 17/246; F16C 2326/24; B62D 7/16;
(Continued)

(56) References Cited

U.S. PATENT DOCUMENTS 2,639,342 A * 5/1953 Cope ........................ B60C 23/08
200/253.1
2,741,673 A * 4/1956 Metcalf ................... B60C 23/08
200/61.24
(Continued)

FOREIGN PATENT DOCUMENTS

DE    102006016144 A1    10/2007
DE    102004025154 A1     6/2010
(Continued)

OTHER PUBLICATIONS

European Patent Office; International Search Report; Oct. 28, 2021.

*Primary Examiner* — Timothy Wilhelm
(74) *Attorney, Agent, or Firm* — Price Heneveld LLP (57) ABSTRACT

A status display, in particular for use on the wheel suspension of a vehicle, includes a first reference unit and a second reference unit, wherein the first and the second reference unit are mounted or fastened to one another via a holding unit, wherein the first reference unit has a first reference geometry, wherein the second reference unit has a second reference geometry, the position of the first reference geometry relative to the second reference geometry being able to be determined optically or haptically by a user, at least in a wear condition of the holding unit.

15 Claims, 4 Drawing Sheets

(58) Field of Classification Search
CPC .......... Y10T 403/20; Y10T 403/32762; B60G 7/001; B60G 2206/10; B60G 2204/143; B60G 2206/601; B60G 7/02; B60G 17/0185; B60G 2800/80; B60G 2206/93; G07C 5/006; B60Q 1/50; B60Q 1/543

See application file for complete search history.

(56) References Cited

U.S. PATENT DOCUMENTS

| | | | | |
|---|---|---|---|---|
| 2,917,020 | A * | 12/1959 | Rivers | B60C 23/08 340/443 |
| 3,055,998 | A * | 9/1962 | Collins | B60C 23/08 D12/604 |
| 3,602,885 | A * | 8/1971 | Grajeda | B60C 23/08 200/61.44 |
| 3,680,523 | A * | 8/1972 | Gaskins | B60C 23/0496 D10/86 |
| 3,736,665 | A * | 6/1973 | La Moreux | G01B 5/146 33/203.16 |
| 3,791,748 | A * | 2/1974 | Goodrich, Jr. | F16C 11/0609 403/27 |
| 3,999,870 | A * | 12/1976 | Clark | F16C 11/0604 184/105.3 |
| 4,017,197 | A * | 4/1977 | Farrant | B60G 7/005 403/138 |
| 4,458,234 | A * | 7/1984 | Brisard | G01M 17/04 340/665 |
| 4,476,455 | A * | 10/1984 | Kawakami | B60C 23/063 200/61.23 |
| 4,540,188 | A * | 9/1985 | Meloche | B60G 17/018 267/64.16 |
| 4,576,499 | A * | 3/1986 | Smith | F16C 11/0671 403/138 |
| 4,626,121 | A * | 12/1986 | Tajima | F16C 11/086 403/138 |
| 4,749,299 | A * | 6/1988 | Swanson | F16C 11/086 403/138 |
| 4,814,744 | A * | 3/1989 | Collins | B60C 23/08 116/34 A |
| 5,101,573 | A * | 4/1992 | Mills | G01M 17/04 269/238 |
| 5,327,116 | A * | 7/1994 | Davidson | B60C 23/08 200/61.24 |
| 5,525,960 | A * | 6/1996 | McCall | B60R 16/0232 200/61.23 |
| 5,583,481 | A * | 12/1996 | Gardner | B60C 23/08 200/61.24 |
| 5,718,633 | A * | 2/1998 | Gehrke | F16D 3/40 116/218 |
| 6,125,541 | A * | 10/2000 | Parker | B23P 11/005 29/446 |
| 6,181,240 | B1 * | 1/2001 | Wu | B60C 23/06 340/444 |
| 6,298,570 | B1 * | 10/2001 | Maughan | G01B 5/146 33/549 |
| 6,532,623 | B1 * | 3/2003 | Watanabe | B60B 33/0068 267/257 |
| 6,533,491 | B1 * | 3/2003 | Redele | F16C 11/0647 403/138 |
| 6,991,239 | B2 * | 1/2006 | Schutt | G01B 11/26 280/124.16 |
| 7,192,032 | B2 * | 3/2007 | Dodd | B60G 17/01925 280/5.506 |
| 7,192,033 | B2 * | 3/2007 | Bolt | B60G 11/27 280/5.514 |
| 7,296,809 | B2 * | 11/2007 | Zebolsky | B60G 7/008 280/86.753 |
| 7,578,513 | B2 * | 8/2009 | Yonekura | B60G 17/005 267/51 |
| 9,238,393 | B2 * | 1/2016 | Gillies | B60G 99/002 |
| 9,315,222 | B1 * | 4/2016 | Wetter | B60G 9/02 |
| 9,315,970 | B2 * | 4/2016 | Chitty | G07C 5/006 |
| 9,375,983 | B2 * | 6/2016 | Lehmann | B60C 23/02 |
| 9,452,657 | B1 * | 9/2016 | Giaier | B60Q 1/08 |
| 9,947,151 | B2 * | 4/2018 | Ellis | B60C 5/005 |
| 10,539,203 | B2 * | 1/2020 | Kunkel | B60G 17/0185 |
| 11,118,645 | B2 * | 9/2021 | Gregg | B60G 11/12 |
| 11,511,582 | B2 * | 11/2022 | Zimmerman | B60G 7/02 |
| 11,679,638 | B2 * | 6/2023 | Nadeau | F16F 13/007 280/6.157 |
| 2003/0205869 | A1 * | 11/2003 | Schutt | G01B 11/26 280/5.514 |
| 2004/0094251 | A1 * | 5/2004 | Strache | B60C 23/0493 340/442 |
| 2005/0146105 | A1 * | 7/2005 | Soles | B60G 7/02 280/86.75 |
| 2017/0248505 | A1 * | 8/2017 | Holmes | F16C 11/0647 |
| 2020/0361316 | A1 * | 11/2020 | Taylor | B60R 16/03 |
| 2023/0034135 | A1 * | 2/2023 | Galazin | B60G 11/04 |
| 2024/0066929 | A1 * | 2/2024 | Pursifull | B60C 23/0479 |

FOREIGN PATENT DOCUMENTS

| | | |
|---|---|---|
| DE | 112005001191 B4 | 2/2015 |
| DE | 102014212673 B3 | 10/2015 |
| DE | 102016107852 A1 | 11/2017 |
| EP | 2935914 B1 | 12/2016 |

* cited by examiner

STATUS DISPLAY

BACKGROUND OF THE INVENTION

The present invention relates to a status display, in particular for use in the chassis of a commercial vehicle.

Status displays for various load and wear conditions in commercial vehicles are already known from the prior art. For example, electrical conductors are used in brake pads which close an electrical circuit when a certain minimum wear condition is reached, signaling to the user of the brake that the brake pad is worn. Other areas in the chassis of a motor vehicle, in particular a commercial vehicle, on the other hand, are often not equipped with simple systems for detecting the wear condition. In these areas, it has been common practice up to now in the prior art to dismantle the relevant components according to maintenance schedules and to replace correspondingly wear-prone components already on suspicion. Also, in the event of unexpected play or noises in the chassis area of vehicles, it is usually necessary to disassemble the corresponding areas of the chassis. This results in a high expenditure of time and money for the operator of a motor vehicle.

In view of these disadvantages of the prior art, it is the object of the present invention to provide a status display which permits reliable and targeted monitoring of the status of individual components by the simplest possible means and without the need for costly modification work on the chassis of a motor vehicle.

SUMMARY OF THE INVENTION

According to the invention, a status display is provided, in particular preferably for use on the wheel suspension of a vehicle, which has a first reference unit and a second reference unit, the first and the second reference unit being mounted or fastened to one another via a holding unit, wherein the first reference unit has a first reference geometry, the second reference unit has a second reference geometry, wherein it is possible, at least in a wear condition of the holding unit, for the position of the first reference geometry relative to the second reference geometry to be determined or read visually or haptically by a user or a detection device. The status display thus detects two assemblies mounted or fixed to one another, the first and the second reference units and a holding unit connecting these two assemblies, wherein the status display is intended in particular to provide information about the wear condition of the holding unit. In the event of wear of the holding unit, which results in a wear condition, the position of the first reference unit relative to the second reference unit therefore changes, wherein this can be read or determined by a user in a simple manner, in particular optically or haptically by means of two reference geometries. In other words, the holding unit is a supporting assembly on the vehicle that positions the reference units relative to one another, with wear on the holding unit resulting in a change in the positioning of the reference units relative to one another. As a visual signal of a wear condition, it can be provided, for example, that one of the two reference geometries remains in a certain position relative to the other reference geometry, wherein this position signalizes a certain state of the holding unit to the user of the status display. In this regard, it is intended that, at least in the wear condition, such a position of the first reference geometry relative to the second reference geometry is detectable by a user. In other words, it may be preferred that in the condition in which the holding unit is not worn and thus the wear condition is not present, no particular position of the first reference geometry relative to the second reference geometry is externally detectable, which signals to the user that it is possible to continue driving with the chassis of the vehicle without any problems. With the aid of the status display according to the invention, it is thereby possible to detect whether or not the wear condition is present without dismantling the components of the running gear involved. Particularly with regard to the search for the cause of, for example, play or rattling in the chassis of a vehicle, which has been common in the prior art up to now, this is a significant labour-saving and time-saving option for determining the exact wear condition of the components in the area of a chassis.

Advantageously, the wear condition of the holding unit is characterized by a permanent deformation of the holding unit due to wear. In other words, plastic deformation or a local geometric change caused by permanent load due to material fatigue or, for example, a local material shrinkage due to abrasive wear is the cause for the presence of the wear condition. This wear condition is often characterized by the fact that the bearing of the first reference unit and the second reference unit against each other has a large clearance, which can cause an adverse change in the driving behaviour of the vehicle. Therefore, in the wear condition, it is advisable to replace the holding unit.

Preferably, the first reference geometry is formed as a recess through which the second reference geometry is visible in the wear condition. As the simplest embodiment of the present invention, it is provided that the first reference geometry is formed as a purposefully arranged recess in the first reference unit, through which the position of the second reference geometry can be determined in the wear condition. The advantage of this embodiment is that, without further mechanical components or interactions of various components of the chassis, it can be checked by simple observation by a user when the commercial vehicle is at a standstill whether or not the wear condition of the holding unit is present.

Preferably, the second reference geometry is formed as a notch or mark on a component of the second reference unit. The second reference geometry can thus be set very precisely on the second reference unit and increases the accuracy in determining the wear condition.

Advantageously, the first reference geometry and/or the second reference geometry has a scale that allows the position of the second reference unit to be determined relative to the first reference unit. The scale is preferably a scale mechanically embossed into the material of the first reference unit in the area of the first reference geometry. Alternatively, a scale printed in a raised colour on the first or the second reference unit is preferred. In this case, the scale particularly allows the detection of intermediate stages between a fully functional holding unit and a completely and dangerously worn holding unit. This allows the user of the status display to plan ahead with regard to any maintenance measures that may be required on the vehicle's chassis.

Advantageously, the second reference geometry is a section of an outer surface of a solid body, which is fixed to the second reference unit. Advantageously, a further component, for example a spacer washer or a thrust washer, on which a corresponding second reference geometry is provided, can be present on the second reference unit. This becomes visible in the area of the first reference unit when the wear condition is present. The advantage of using a further component on which the second reference geometry is provided is that a special colour highlighting can be applied to the component, wherein the other areas of the chassis can remain unchanged.

In a particularly preferred embodiment, the second reference geometry is in the form of a projection and is designed to permanently deform and/or deflect the first reference geometry when the wear condition is reached, the deformed or deflected condition of the first reference geometry signalling the presence of the wear condition to a user. In particular, if the areas of the chassis in which the wear can be indicated in a simple manner are very difficult to see, it may be preferable to use a mechanical displacement of a first reference geometry and the second reference geometry in order to signal the presence of the wear condition to a user in a simple manner. For this purpose, in particular a second reference geometry formed as a projection can deform the first reference geometry accordingly, i.e., pivot or plastically deform it, whereby a user can determine whether or not the wear condition of the holding unit is present on the basis of the state of the first reference geometry, in particular preferably haptically and without a free view of the first reference geometry. In particular, the deformation of the first reference geometry can also be used to transmit a switch for electrical signalling of the wear condition to the driver's cab of the vehicle.

Furthermore, the first reference unit preferably comprises a bearing block of a chassis, the second reference unit comprising a steering element pivotably suspended on the bearing block, the holding unit having a bolt element and a bushing, which are designed to support the steering element relative to the bearing block. In this particularly preferred embodiment, the status display is thus integrated into the suspension of a steering element on a chassis, which is usually implemented by means of a bearing block. The first reference unit preferably comprises the bearing block, the bearing block being advantageously attached to the frame of a chassis of a vehicle together with further attachments. The second reference unit comprises the control arm, preferably a trailing arm. Both reference units are thereby connected via a holding unit, which preferably has a bolt element fixed to the bearing block and a bushing, the bushing in turn permitting pivotable mounting of the arm element. In this context, rubber bushings or otherwise elastically deformable or wear-reducing metal bushings are preferably used as bushings. In other words, in this preferred embodiment, the bushing is the component whose wear is to be monitored by the status display. Thus, a permanent displacement of the second reference unit relative to the first reference unit due to a permanent deformation or damage of the bushing of the holding unit serves as an indication that a wear condition exists in the holding unit.

Advantageously, the first reference geometry is arranged on one leg of the bearing block between the fastening area of the bearing block on a frame of the vehicle and the receiving area of the bolt element on the bearing block, the second reference geometry being displaced in the wear condition due to the weight of the vehicle in such a way that its position on or in the first reference geometry can be read or detected haptically or visually. In other words, the first reference geometry is thus provided above the mounting area for the bearing bolt on which the steering element is pivotably suspended from the bearing block. This allows that due to the upward pushing of the steering element relative to the bearing block, this direction of movement can be used to detect a wear condition when the steering element or another second reference geometry fixed to the bearing bolt, or to the steering element, becomes visible in the first reference geometry or the first reference geometry is correspondingly deformed or deflected, so that a haptic detection of the wear condition can be made.

Advantageously, the second reference geometry is also the outer surface of a bearing eye of the steering element. In this particularly simple embodiment of the status display, which consists of only a few components, no further components are necessary. The second reference geometry is preferably designed as a color-coded outer surface of a bearing eye of the steering element, wherein in the event of wear of the holding unit this outer surface moves into the area visible through the first reference geometry and the wear condition can thus be detected, in particular visually.

In an alternative embodiment, the second reference geometry is an outer surface of a disc element, which is arranged between the bearing block and the steering element and is held by the bolt element. Advantageously, the disc element can be a thrust washer in the area of the arm suspension, wherein the disc element can in particular allow precise determination of the wearing condition by adjusting the outer diameter of the disc element accordingly and thus, at a certain offset of the second reference unit relative to the first reference unit, the outer surface of the disc element, which serves as the second reference geometry, can be visible in the first reference geometry. This makes it possible to set an exact value for the corresponding wear that must at least be present on the holding unit in order to be represented as a wear condition that requires replacement or repair of the holding unit.

Advantageously, the first and/or the second reference geometry have at least one signal colour. The use of a signal colour, in particular red or yellow, or a mixture of different signal colours, enables a user to clearly recognize whether the wear condition of the running gear has been reached and maintenance must be performed, or whether this is not yet the case. Signal colours are a cost-effective means of improving the perceptibility of the corresponding position of the first reference geometry and the second reference geometry, which can be applied to the status display without the need for further equipment such as electric lights. Advantageously, a string of different signal colours can also function as a scale. A first colour area, for example green, on the first or second reference geometry can indicate that there is still no wear, wherein adjacent yellow and red colour areas indicate that maintenance should or urgently needs to be carried out.

Furthermore, according to the invention, a status display is provided, in particular preferably for use on the wheel suspension of a vehicle, which has a first reference unit and a second reference unit, the first and second reference units being mounted or fastened to one another via a holding unit, the first reference unit having a first reference geometry, the second reference unit having a second reference geometry, the position of the first reference geometry relative to the second reference geometry being an expression of a certain wear of the holding unit. This preferred status display according to the invention is characterized, in contrast to the status display described above, in that instead of the direct haptic or optical perceptibility of the wear condition, the position of the first and the second reference geometry is used to transmit a specific display signal to a display unit which reproduces the wear condition accordingly. The display unit may thereby comprise at least one optical and/or one acoustic display element, such as a loudspeaker, an LED or a digital reproduction on a corresponding monitoring screen. The corresponding component that activates or deactivates the at least one display element or several display elements can be a contact that is closed or opened by the relative movement of the first and second reference geometry.

Advantageously, the display unit has at least one sensor which is designed to determine the relative position of the first reference geometry to the second reference geometry. Such a sensor could be, for example, a light barrier that preferably operates without contact. Additionally, or alternatively preferably, a potentiometer can be used as a sensor which, depending on the position of the first reference geometry relative to the second reference geometry, outputs a specific voltage by means of which the wear condition can be output in the most precise manner by the display unit.

BRIEF DESCRIPTION OF THE DRAWINGS

Further advantages and features of preferred embodiments of the invention will be apparent from the following description with reference to the accompanying figures. Showing.

DETAILED DESCRIPTION OF THE PREFERRED EMBODIMENTS

Figure 1:
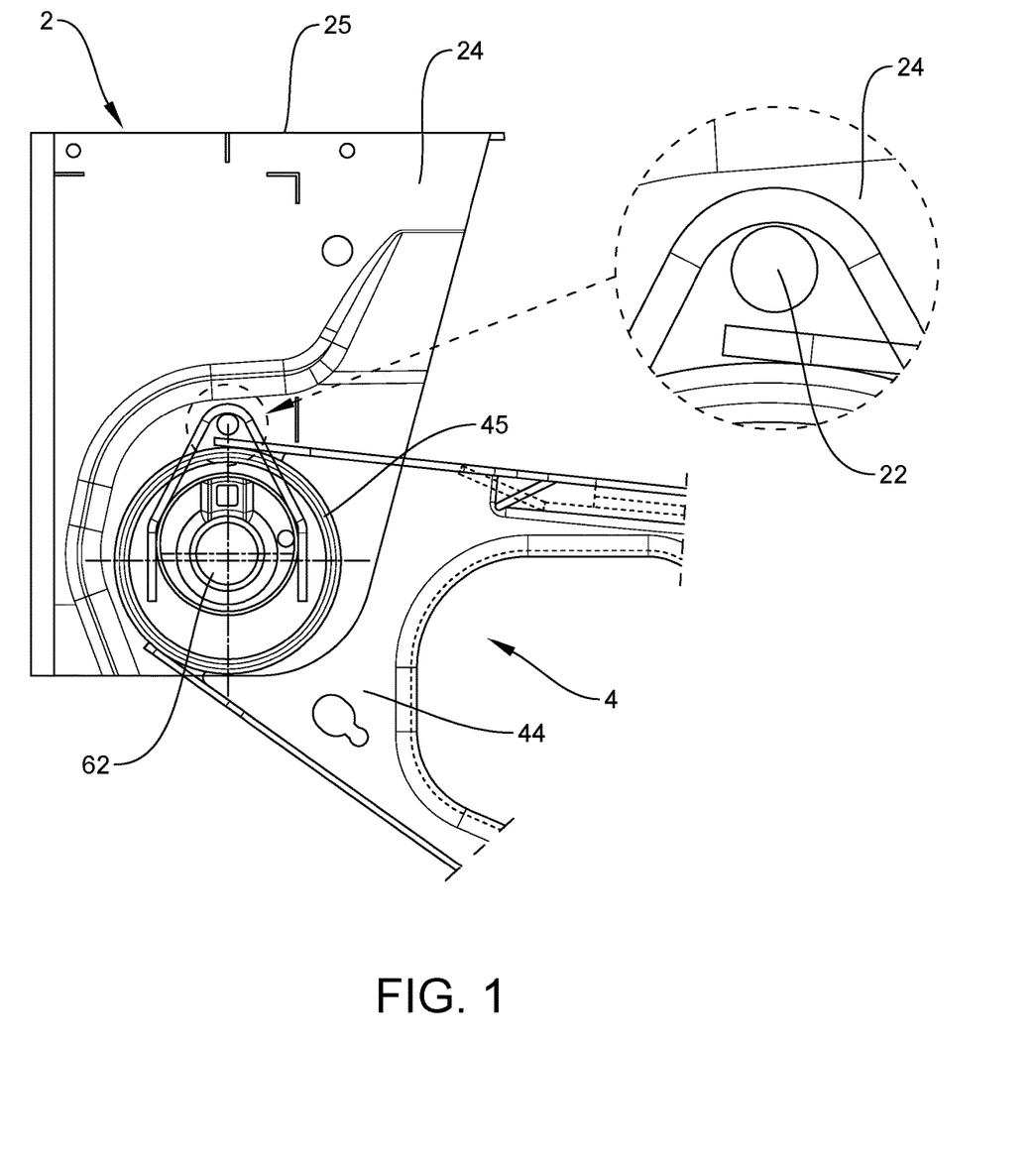
FIG. 1 is a preferred embodiment of a status display according to the invention.

In the preferred system of an embodiment with a status display according to the present invention shown in FIG. 1, the first reference unit 2 and the second reference unit 4, which is movably mounted with respect thereto, are shown. The first reference unit 2 comprises a bearing block 24, which can be fixed to the frame of a vehicle by means of a fastening area 25 on its upper side. Furthermore, the bearing block 24 has an area in which a steering element 44 of the second reference unit 4 can be pivotably fixed by means of a bolt element 62. In this case, the steering element 44 is preferably mounted on the bolt element 62 via a bushing (not shown). In the enlarged view of the area above the fastening of the bolt element 62 shown on the right, it is shown that a first reference geometry 22 is formed on the bearing block 24, which in the present embodiment is introduced as a circular hole in the material of the bearing block 24. In the condition shown in FIG. 1, no outer surface of the second reference unit can be seen through the first reference geometry 22. This means that the chassis system of FIG. 1 is not in the wear condition V.

Figure 2:
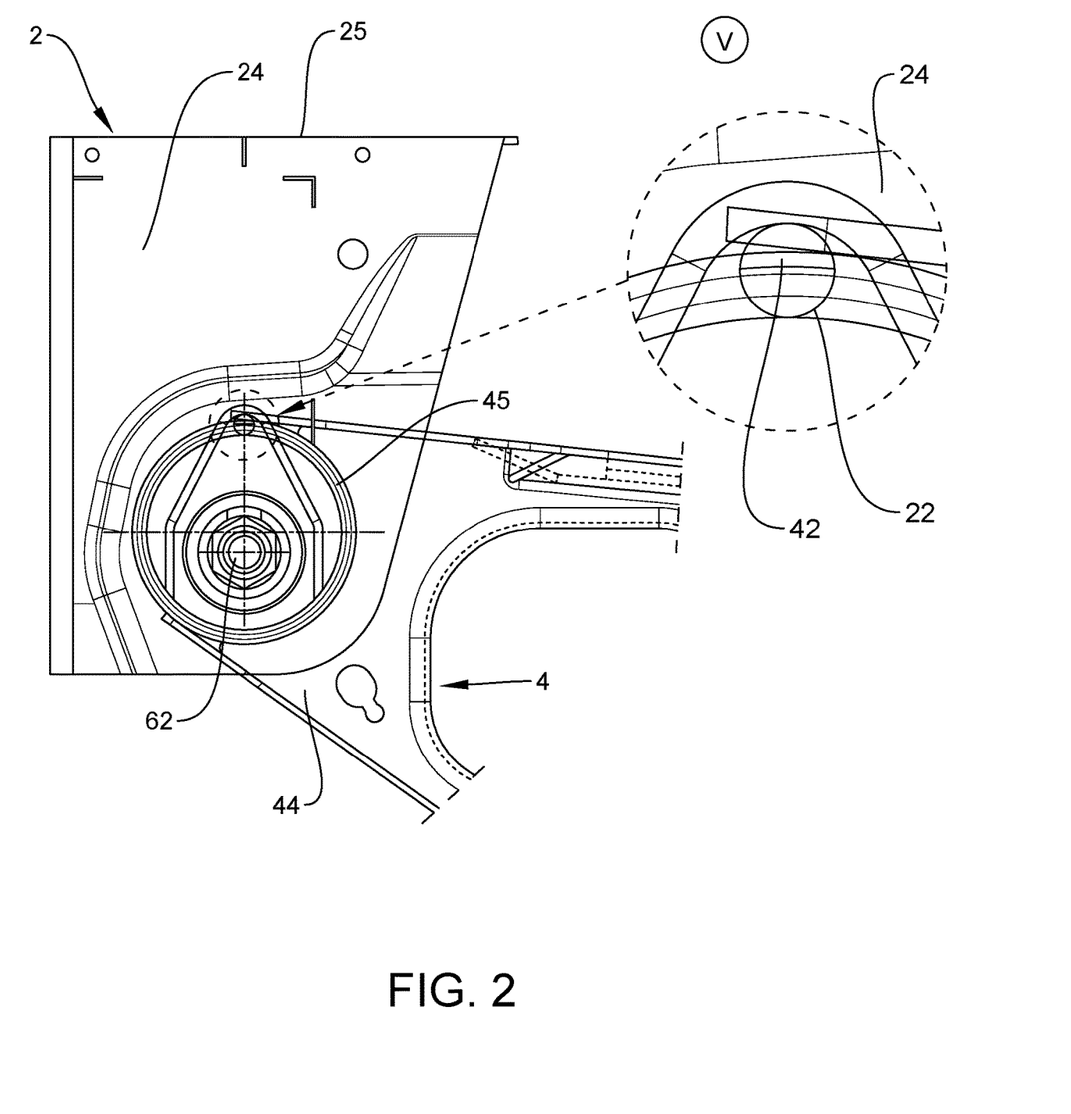
FIG. 2 is the embodiment of the status display shown in FIG. 1 in the wear condition.

FIG. 2 shows the chassis system of FIG. 1 in the wear condition V. Here, analogous to the parts of the chassis system described in FIG. 1, it can be seen in the enlarged representation of the first reference geometry 22 that the steering element 44 has moved upwards there relative to the first reference unit 2 and its corresponding outer surface is visible through the second reference geometry 22. This signals to the user of the status display that the holding unit 6 is worn in such a way that the proper bearing of the steering element 44 on the bearing block 24 is no longer guaranteed. In the presence of the condition shown in FIG. 2, the user would therefore be advised to carry out a maintenance measure on the vehicle's chassis system.

Figure 3:
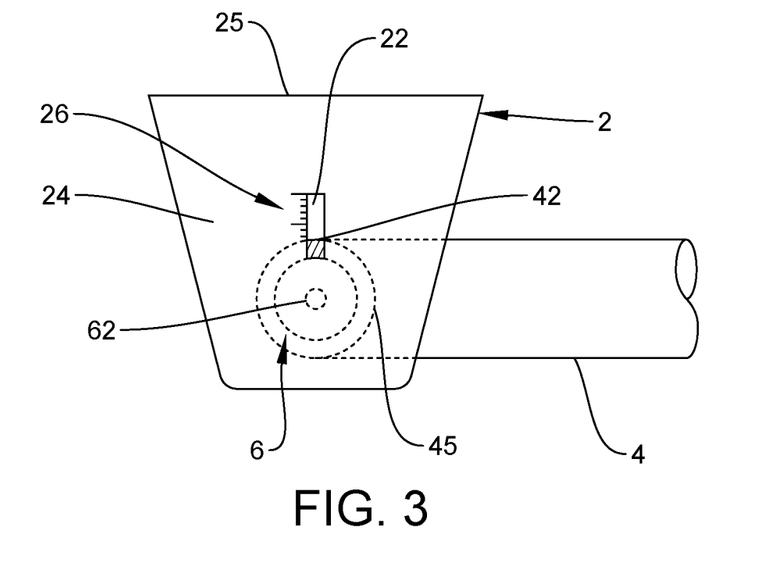
FIG. 3 is a schematic view of a further preferred embodiment of the status display according to the invention.

FIG. 3 shows a further preferred embodiment in which the first reference unit 2 also has a bearing block 24, the first reference geometry 22 being introduced as a rectangular elongated hole in the material of the bearing block 24. In addition, the first reference geometry 22 has a scale 26 by means of which the exact positioning of the second reference unit, in particular of the second reference geometry 42 in the first reference geometry 22, can be read. The bearing eye 45 of the steering element 44 preferably provided on the second reference unit 4 is shown dashed.

Figure 4:
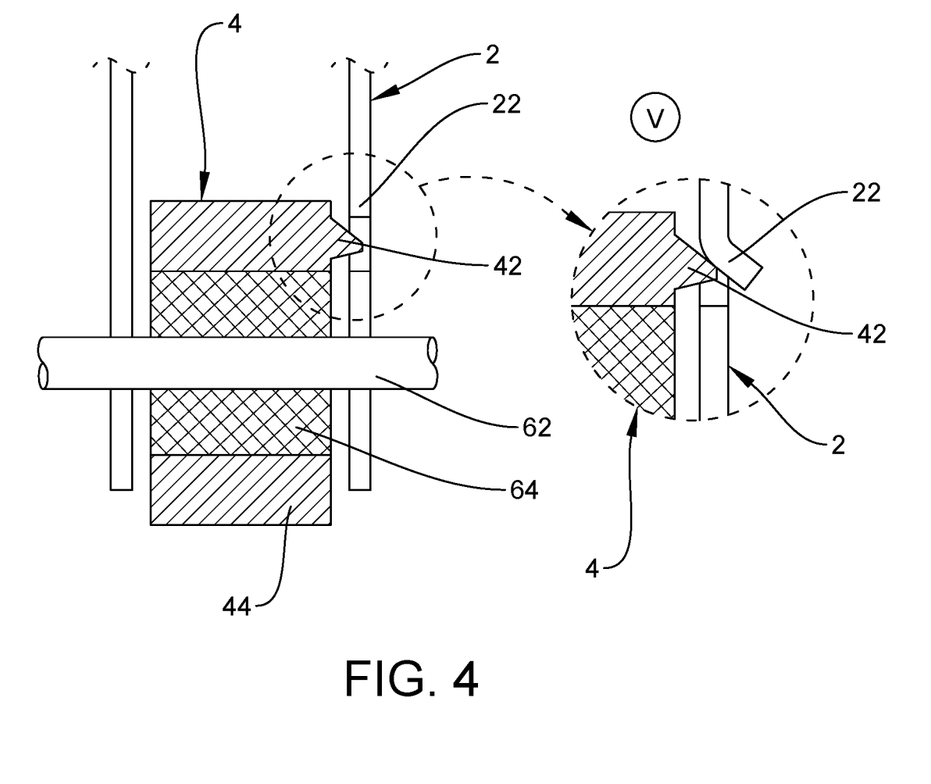
FIG. 4 is a further schematic view of a preferred embodiment of the status display according to the invention.

FIG. 4 shows a further preferred embodiment of the status display according to the invention in two states. The left side of the Figure shows the state in which there is no excessive wear on the holding unit 6. In this case, the first reference geometry 22 is implemented as a nose-shaped section on the material of a sheet-metal-like component of the first reference unit 2. The second reference geometry 42 is designed as a projection, which is preferably made in one piece on one of the components of the second reference unit 4. Advantageously, the corresponding component of the second reference unit 4 is a steering element 44. In the state shown on the left in the Figure, the second reference geometry 42 is out of engagement with the first reference geometry 22. Only when increasing wear occurs on the bushing 64 of the holding unit 6 and a corresponding secure mounting of the second reference unit 4 is no longer ensured, is the second reference geometry 42 displaced relative to the first reference unit 2 in such a way that the second reference geometry 42 permanently deforms or deflects the first reference geometry 22 so that the latter is pivoted to the right in the Figure. This deformed or deflected state of the first reference geometry 22 allows a user to haptically determine the wear condition V on the chassis, as the position of the first reference geometry 22 can be determined by simply feeling a corresponding area on the first reference unit 2. As an alternative to the plastic deformation shown in FIG. 4, the first reference geometry 22 can also be characterized, for example, by a pivotable suspension, which allows a specific section of the first reference geometry 22 to be simply pivoted out, whereby after completion of the corresponding maintenance work on the chassis, the first reference geometry 22 pivots back to its state in which it does not signal a wear condition V.

Figure 5A:
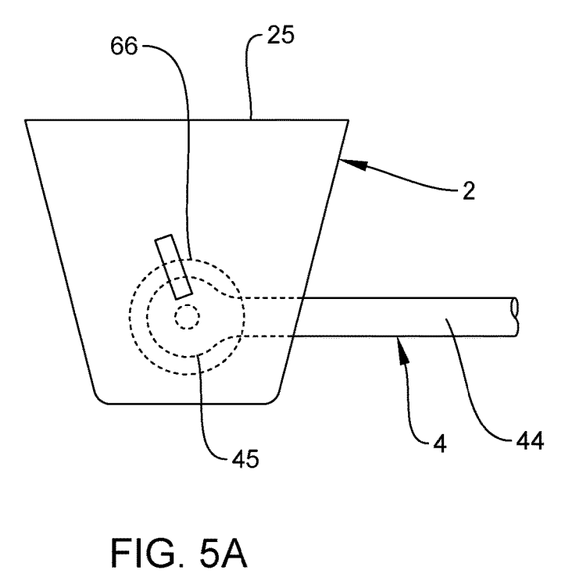
FIG. 5A is a side elevation schematic view of a preferred embodiment of the status display according to the invention.
Figure 5B:
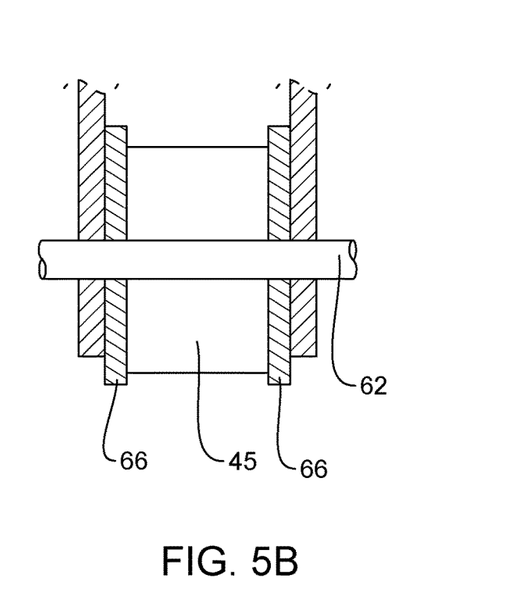
FIG. 5B is a cross-sectional end side of the status display of FIG. 5A.

FIGS. 5A and 5B show another preferred embodiment of the status display according to the invention, wherein the second reference geometry 42 is provided on an additional component, a disc element 66 fixed to the bolt element 62.

REFERENCE SIGN

2—first reference unit
6—holding unit
4—second reference unit
22—first reference geometry
24—bearing block
25—fastening area
26—scale
42—second reference geometry
44—steering element
45—bearing eye
62—bolt element
64—bushing
66—disc element
V—wear condition

The invention claimed is:

1. A status display for use on the wheel suspension of a vehicle, comprising:
a first reference unit; and
a second reference unit;
wherein the first and second reference units are mounted or fastened to one another via a holding unit;
wherein the first reference unit has a first reference geometry;
wherein the second reference unit has a second reference geometry;
wherein at least in a wear condition of the holding unit a position of the first reference geometry relative to the second reference geometry is configured to be determined optically or haptically;
wherein the wear condition includes a permanent deformation of the holding unit due to wear;
wherein the status display is configured to determine the wear condition of the holding unit;
wherein the first reference geometry is formed as a recess through which the second reference geometry is visible in the wear condition; and
wherein the second reference geometry is formed as a notch or mark on a component of the second reference unit.

2. The status display according to claim 1, wherein the second reference geometry is exclusively visible in the wear condition in the first reference geometry.

3. The status display according to claim 1, wherein the second reference geometry is formed as a notch or mark on a component of the second reference unit.

4. The status display according to claim 1, wherein the first and/or the second reference geometry comprise a scale configured to allow determination of the position of the second reference unit relative to the first reference unit.

5. The status display according to claim 1, wherein the second reference geometry includes a portion of an outer surface of a solid body which is fixed to the second reference unit.

6. The status display according to claim 1, wherein the second reference geometry includes a protrusion and is configured to permanently deform the first reference geometry upon reaching the wear condition, and wherein the deformed condition of the first reference geometry signals a presence of the wear condition to a user.

7. The status display according to claim 1, wherein the first and/or the second reference geometry have a signal colour.

8. A status display for use on the wheel suspension of a vehicle, comprising:
a first reference unit; and
a second reference unit;
wherein the first and second reference units are mounted or fastened to one another via a holding unit;
wherein the first reference unit has a first reference geometry;
wherein the second reference unit has a second reference geometry;
wherein at least in a wear condition of the holding unit a position of the first reference geometry relative to the second reference geometry is configured to be determined optically or haptically;
wherein the wear condition includes a permanent deformation of the holding unit due to wear;
wherein the status display is configured to determine the wear condition of the holding unit;
wherein the first reference unit comprises a bearing block of a chassis, wherein the second reference unit comprises a steering element pivotally suspended from the bearing block, and wherein the holding unit comprises a bolt element and a bushing which are configured to support the steering element relative to the bearing block; and
wherein the first reference geometry is arranged on a leg of the bearing block between the fastening area of the bearing block to a frame of a vehicle and the receiving area of the bolt element on the bearing block, and wherein the second reference geometry is displaced in the wear condition due to a weight force of the vehicle in such a way that its position on or in the first reference geometry is configured to be read haptically or optically.

9. The status display according to claim 8, wherein the second reference geometry includes an outer surface of a bearing eye of the steering element.

10. The status display according to claim 8, wherein the second reference geometry includes an outer surface of a disc element disposed between the bearing block and the steering element and retained by the bolt element.

11. A status display for use on the wheel suspension of a vehicle, comprising:
a first reference unit; and
a second reference unit;
wherein the first and second reference units are mounted or fastened to one another via a holding unit;
wherein the first reference unit comprises a bearing block and wherein the second reference unit comprises an arm;
wherein the first reference unit has a first reference geometry;
wherein the second reference unit has a second reference geometry;
wherein a change of a wear condition of the holding unit changes the position of the first reference geometry relative to the second reference geometry;
wherein the position of the first reference geometry relative to the second reference geometry is an expression of a certain wear of the holding unit, which is indicated by a display unit;
wherein the first reference geometry is formed as a recess through which the second reference geometry is visible in the wear condition; and
wherein the second reference geometry is formed as a notch or mark on a component of the second reference unit.

12. The status display according to claim 11, wherein the display unit comprises at least one sensor adapted to determine the relative position of the first reference geometry to the second reference geometry.

13. A status display for use on the wheel suspension of a vehicle, comprising:
a first reference unit; and
a second reference unit;
wherein the first and second reference units are mounted or fastened to one another via a holding unit;
wherein the first reference unit has a first reference geometry;
wherein the second reference unit has a second reference geometry;
wherein at least in a wear condition of the holding unit a position of the first reference geometry relative to the second reference geometry is configured to be determined optically or haptically;

wherein the wear condition includes a permanent deformation of the holding unit due to wear;
wherein the status display is configured to determine the wear condition of the holding unit; and
wherein the first and/or the second reference geometry comprise a scale configured to allow determination of the position of the second reference unit relative to the first reference unit.

14. A status display for use on the wheel suspension of a vehicle, comprising:
a first reference unit; and
a second reference unit;
wherein the first and second reference units are mounted or fastened to one another via a holding unit;
wherein the first reference unit has a first reference geometry;
wherein the second reference unit has a second reference geometry;
wherein at least in a wear condition of the holding unit a position of the first reference geometry relative to the second reference geometry is configured to be determined optically or haptically;
wherein the wear condition includes a permanent deformation of the holding unit due to wear;
wherein the status display is configured to determine the wear condition of the holding unit;
wherein the second reference geometry includes a portion of an outer surface of a solid body which is fixed to the second reference unit; and
wherein the second reference geometry is exclusively visible in the wear condition in the first reference geometry.

15. A method for determining the wear condition of a wheel suspension of a vehicle, comprising:
providing a first reference unit, a second reference unit and a holding unit, wherein the first and second reference units are mounted or fixed to each other via the holding unit, wherein the first reference unit comprises a bearing block of a chassis and the second reference unit comprises a steering element pivotally suspended from the bearing block, wherein the holding unit includes a bolt element and a bushing which are configured to support the steering element relative to the bearing block, and wherein the first reference unit has a first reference geometry and the second reference unit has a second reference geometry;
optically or haptically determining the position of the first reference geometry relative to the second reference geometry;
inferring a wear condition of the holding unit, wherein the wear condition includes a permanent deformation of the holding unit due to wear;
wherein the first reference geometry is formed as a recess through which the second reference geometry is visible in the wear condition; and
wherein the second reference geometry is formed as a notch or mark on a component of the second reference unit.

\* \* \* \* \*